United States Patent [19]
Rodriquez

[11] 3,836,814
[45] Sept. 17, 1974

[54] THREE-WAY LAMP CONVERTER

[76] Inventor: Edward T. Rodriquez, 16 Sargeant Rd., Winchester, Mass. 01890

[22] Filed: Dec. 22, 1972

[21] Appl. No.: 317,630

[52] U.S. Cl................... 315/51, 315/49, 315/71, 315/72
[51] Int. Cl........................ H01j 7/44, H01j 19/78
[58] Field of Search............ 315/200 R, 51, 52, 53, 315/226, 272, 209 R, 209 SC

[56] References Cited
UNITED STATES PATENTS

| | | | |
|---|---|---|---|
| 3,201,597 | 8/1965 | Balan | 315/200 R |
| 3,517,259 | 6/1970 | Dotto | 315/200 R |
| 3,543,088 | 11/1970 | Garrett | 315/200 R X |
| 3,573,543 | 4/1971 | Grindstaff | 315/200 R X |

*Primary Examiner*—Nathan Kaufman
*Attorney, Agent, or Firm*—Louis Orenbuch

[57] ABSTRACT

A conversion device is disclosed which adapts a three-way light fixture to the use of an ordinary electric bulb of the type having but a single filament. The device employs a pair of current controllers which can be activated separately or together by the three-way switch of the light fixture. Each controller governs the current flow to the filament during different half cycles of the full cycle of the impressed a.c. line voltage. One controller employs a trigger circuit to gate an SCR on at a predetermined phase of the a.c. wave whereby the SCR conducts current to the filament for a portion of a half wave to provide the lowest level of illumination. The other controller utilizes a diode to permit one half of the full wave alternating current to flow in the filament to provide an intermediate level of illumination. The highest level of illumination is obtained where the current controllers are activated together so that the diode conducts for one half of the a.c. cycle and the SCR conducts for a portion of the other half of the a.c. cycle.

2 Claims, 7 Drawing Figures

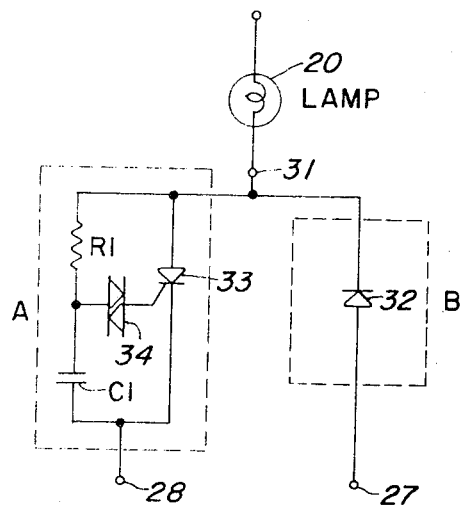
FIG. 4
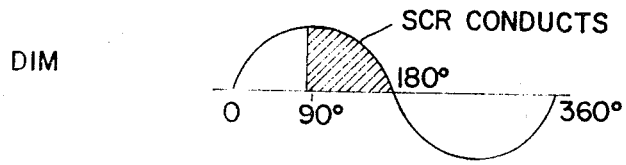
FIG. 5A  DIM
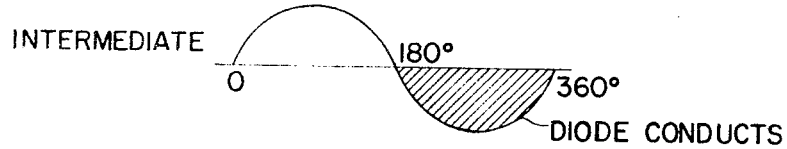
FIG. 5B  INTERMEDIATE
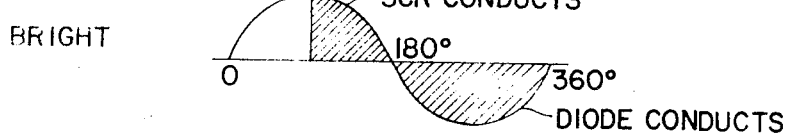
FIG. 5C  BRIGHT

THREE-WAY LAMP CONVERTER

FIELD OF THE INVENTION

This invention relates in general to the control of illumination from an incandescent lamp heated by alternating current electricity. More particularly, the invention relates to a device which permits the ordinary electric lamp having but a single incandescent filament to be employed to provide three levels of light in simulation of a three-way bulb.

BACKGROUND OF THE INVENTION

Electrical fixtures which provide three levels of illumination are in widespread use. Such electrical fixtures employ a 3-way bulb having two filaments which are used separately to provide two levels of illumination and are used together to provide the third and brightest level of illumination. To permit selection among the three levels of illumination, the electrical fixtures employ a switch having, in addition to an OFF position, three other positions whereby separate electrical connection to different filaments in the three-way bulb is made in two positions of the switch and electrical connection to both filaments is made in the third position. The two filaments in the three-way bulb each hvve one end separately connected to different terminals in the base of the bulb and the other filament ends are connected in common to a third terminal at the bulb's base.

Each filament of the three-way bulb is intended to have the full line voltage impressed upon it in normal operation. Because of its two filament construction, the three-way bulb is more expensive than the ordinary single filament bulb of equal wattage. Adding to the cost of employing three-way bulbs is the tendency of three-way bulbs to have a shorter life than the single filament bulb. The shorter life is attributable, at least in part, to the surge currents which flow in the cold filaments when switching past low levels of illumination to the higher levels. Because of surge currents, three-way bulbs have an annoying tendency for one filament to "burn out" (i.e. become inoperative) before the other filament whereby the bulb then provides only one level of illumination.

SUMMARY OF THE INVENTION

The invention, in the preferred form, employs a diode to permit only one half of the full wave alternating current to flow in the filament in one position of the switch. In another position of the switch the diode is out of the circuit and an SCR is placed in the circuit to the filament to cause a portion of the other half cycle of the alternating current to flow in the filament. A trigger circuit is employed to gate the SCR on at a predetermined phase of the a.c. wave whereby the SCR is on for a portion of a half wave to provide the lowest level of illumination. In the third position of the switch, the diode conducts current to the filament during one half of the a.c. cycle and the SCR conducts current to the filament for a portion of the other half of the a.c. cycle to provide the highest level of illumination. Inasmuch as the full cycle alternating current is never allowed to flow in the filament, the filament tends to last longer as it does not reach its full rated temperature.

THE DRAWINGS

The invention, both as to its construction and its mode of operation, can be better understood from the exposition which follows when it is considered in conjunction with the accompanying drawings in which.

Figure 3:
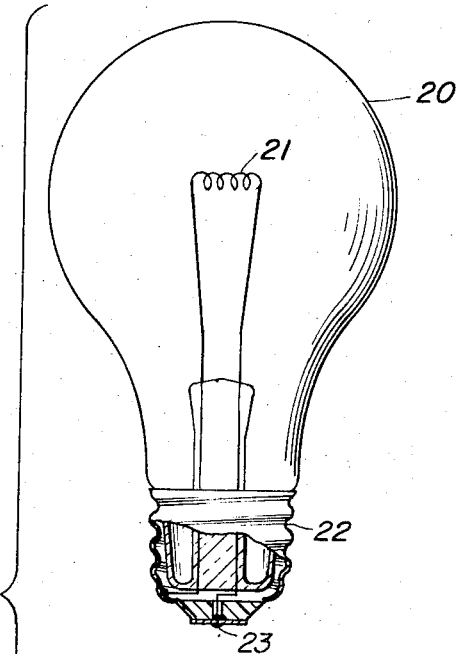

FIG. 3 schematically depicts the preferred embodiment of the invention in relation to an ordinary single filament light bulb;

FIG. 4 is a circuit diagram showing the arrangement of the current controllers A and B employed in the invention;

FIG. 5A shows the phase angle of conduction when the invention is employed for dim lighting;

FIG. 5B shows the phase angle of conduction provided by the invention for the intermediate level of illumination;

FIG. 5C shows the phase angle of conduction provided by the invention for the bright level of illumination.

Figure 1:
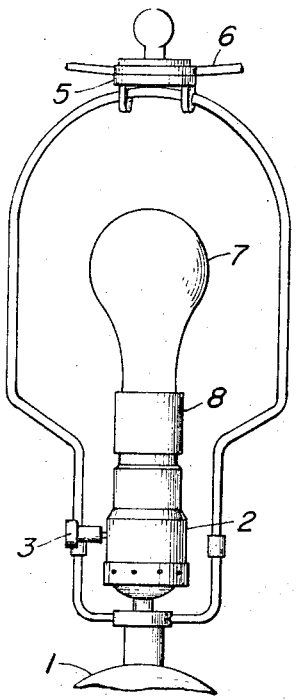
FIG. 1 shows the preferred embodiment of the invention employed with a lamp fixture having a three-way switch.

The preferred embodiment of the invention is depicted in FIG. 1 in the form of a conversion device which screws into the socket of a conventional three-way lamp fixture. The conventional lamp fixture is partially illustrated in FIG. 1 to show the body 1 of the fixture having affixed to it a conventional lamp socket 2 containing a four position switch controlled by a rotary knob 3. To provide support for a lamp shade, a stirrup 4 is provided which is attached to the body 1 and forms a frame around the socket 2. The stirrup has a wide aperture to accommodate the electric light bulb and has a narrower lower portion that is closely spaced from the lamp socket. Atop the stirrup is a bracket 5 to which the frame 6 of the lamp shade is secured in the usual manner. The four position switch of the conventional three-way lamp provides an OFF position and three other positions at which the conventional three-way bulb which has two filaments provides three levels of illumination, i.e. dim, intermediate, and bright. To convert the lamp fixture to a device permitting three-levels of illumination to be obtained with an ordinary incandescent bulb 7 having but a single filament, a conversion device 8, constructed in accordance with the invention, is situated in the lamp socket 2.

Figure 2:
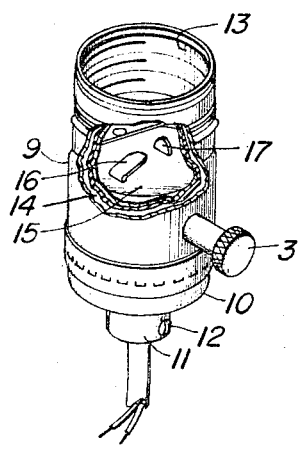
FIG. 2 depicts the internal electrode arrangement of the conventional three-way lamp socket.

The lamp socket 2 is shown in FIG. 2 with the wall partially broken away to expose the arrangement of the terminals in the socket. The socket has an upper cylindrical shell 9 to which a cap 10 is attached to form a housing enclosing the four-position switch. Rotary knob 3 protrudes from the housing to permit the switch to be placed in any one of its four positions. The cap 10 carries a collar 11 having a set screw 12 whereby the lamp socket can be secured to a supporting tube. Within shell 9 is a cylindrical thimble 13, of brass or copper, which is threaded to accept the screw base of an electric bulb. The thimble 13, being an electrical conductor, is insulated from the shell 9 by a cylindrical member 14 which forms an insulative wall between the thimble 13 and shell 9. The thimble is attached to an insulative disc 15 which covers the subjacent four-way switch. Protruding upwardly through the insulative disc, as viewed in FIG. 2 is a centrally disposed electrode 16 in the form of a leaf spring bent to lie generally parallel to the surface of disc 15. A second electrode 17 also protrudes upwardly through the insulative disc and forms a rigid finger extending perpendicularly to the disc. When a conventional three-way lamp is inserted in the socket, the central electrode in the base of the lamp presses upon the leaf spring 16 and another electrode in the base of the lamp contacts the finger electrode 17. By turning the knob 3 of the four position switch, electrodes 16 and 17 can be separately electrically energized in two positions of the switch and can be electrically energized together in a third switch position. When the electrodes 16 and 17, are jointly or separately energized, an electric potential is established between the energized electrode and thimble 13 whereby when a three-way electric bulb is secured in the socket current flows and heats one or both filaments in the lamp.

To permit the conversion device 8, shown in FIG. 1, to be screwed into the conventional socket 2 without requiring removal of the stirrup 4, the profile of the conversion device is such that the device can rotate within the narrower aperture of the stirrup. Further, the height of the conversion device is kept as low as possible to allow sufficient space to permit lamp 7 to be unscrewed and removed without necessitating dismantling of the stirrup.

The scheme of the invention is illustrated in FIG. 3 where the conversion device is shown in relation to a light bulb 20 having a single filament 21 and a screw base 22. The filament 21 has one end connected to a central electrode 23 at the base and has its other end in electrical connection with the threaded base member. The three-way converter 8 has a housing 24 of an electrically insulative material. Preferably, the housing is made of a mechanically strong synthetic material such as a hard thermosetting urea-formaldehyde resin which permits the wall of the housing to be in the order of one-sixteenth inch thick. Where the housing has a relative thin wall, it conduces to a slender silhouette and facilitates fitting the conversion device within the narrow aperture of the stirrup. The housing, at its lower end, carries a hollow brass ferrule 25 which is threaded to mate with the socket of the conventional three-way light fixture. The ferrule is closed by an insulative disc 26 through which a centrally disposed electrode 27 extends. Surrounding the central electrode and insulated from it by the disc is an annular electrode 28. The ferrule, disc, and electrodes 27, 28, in essence, are a replica of the base of the conventional 3 way lamp. When the conversion device is screwed into the conventional 3-way socket, electrode 27 contacts the leaf spring 16 (FIG. 2) and electrode 28 contacts the finger electrode 17.

Housing 24 has a central opening 28 for receiving the base of light bulb 20. Within the opening is disposed a threaded annular thimble 29 of brass or copper with which the screw base of the bulb mates. The thimble 29 is electrically connected to the ferrule 25 by tabs which extend through slots in the floor 30 of the housing and are soldered or otherwise connected to the ferrule. Secured to the floor of the housing and extending above it, is a leaf spring electrode 31 situated to have the central electrode 23 of light bulb 20 bear upon the spring when the bulb is screwed into the converter.

Enclosed within the hollow base of the converter are devices A and B which control the flow of electrical current. The A device governs the flow of current between electrode 28 and electrode 31. The B device governs the flow of current between electrode 27 and electrode 31.

The arrangement of the current controllers A and B is schematically shown in FIG. 4. The B controller is a rectifier diode 32, connected between terminals 28 and 31 which can permit current to flow to the filament of lamp 20 only during the half of the a.c. cycle in which the diode is forwardly biased. During the other half of the a.c. cycle the rectifier diode is reversely biased by the a.c. voltage and blocks the flow current. In that other half cycle the A controller can permit current to flow in the filament for a portion of the half cycle.

The A controller employs an SCR 33 having its anode and cathode connected to terminals 31 and 28. In relation to terminal 31, the SCR is arranged to conduct current in the direction opposite to the direction of current conduction of diode 32. Thus, where diode 32 is arranged to conduct current to terminal 31, the SCR is arranged to conduct current away from terminal 31. The gate of the SCR is connected by a trigger device 34 to a timing circuit formed by resistor R1 and capacitor C1. The trigger device is illustrated in FIG. 2 by the symbol for a diac. However, the trigger device need not be a bidirectional device such as the diac inasmuch as the trigger device need function only during a half cycle of the a.c. voltage and therefore can be a unidirectional device.

The resistor R1 and capacitor C2 are connected in series between terminals 10 and 13 whereby the capacitor C1 charges through the combined resistance of R1 and the filament of the lamp. As is well known, the resistance of the tungsten filament of a lamp is relatively low when the filament is cold and increases as the filament becomes hotter. The RC time constant therefore is in some measure dependent upon the temperature of the filament in the lamp and affects the rate at which capacitor C1 charges. Where the filament of the lamp is heated only by the current flowing through the SCR, the filament is somewhat dim and its resistance is consequently relatively low. Where the filament is also heated by the current flowing through diode 32, the filament's temperature is substantially increased and consequently its light output and its resistance is increased. Thus the charging rate for capacitor C1 is higher when the lamp is heated only by the current flowing through the SCR than it is when the filament is also heated by current flowing through diode 32.

The trigger device 34 is connected across capacitor C1 through the gate and cathode of the SCR. When the voltage of the capacitor reaches the breakover voltage of the diac, capacitor C1 discharges into the gate of the SCR and turns the SCR on if the anode of the SCR is positive relative to the cathode. Upon being triggered into conduction, the SCR remains on until its anode goes negative and turns the SCR off. The SCR allows current to flow in the filament of the lamp during the time the SCR is on. Preferably, the ohmic value of resistor R1 is such that, with the filament heated by current through the diode 32, the SCR is triggered on at the 90° phase angle of the a.c. wave, as indicated in FIG. 5C. Thus, with both diode 32 and SCR 33 in the circuit to the lamp, current flows in the filament for 270° of the a.c. wave. With the diode 32 out of the circuit to the lamp, the SCR is triggered on earlier than the 90° phase angle, as indicated in FIG. 5A, and conducts current for somewhat more than 90° of the a.c. wave.

The R1C1 timing circuit can be arranged to turn the SCR on at any selected phase angle of the a.c. wave and thereby set the "dim" light level provided by the lamp. The intermediate light level is determined by the half wave conduction of diode 32, as indicated in FIG. 5B. Inasmuch as the dim level is preferable somewhat less than the intermediate light level, the SCR must conduct for less than 180° to make the dim level perceptible from the intermediate level. The first 30° of a half cycle contributes only 6 percent of the total power in the half cycle. Therefore, the SCR should conduct for less than 150° to make the dim level appreciable different from the intermediate level.

With controllers A and B both in the circuit to the filament of lamp 20, the lamp provides its highest level of illumination. Even at the highest level, current flows in the filament for less than the full a.c. cycle, as indicated in FIG. 5C. Inasmuch as the filament is never heated to the extent possible over the full a.c. cycle, the life of the lamp tends to be extended because the filament is not permitted to reach the maximum full a.c. cycle temperature.

A converter constructed in accordance with the invention can be used without requiring disassembly or alteration of the wiring of the conventional three-way lamp fixture. The preferred embodiment of the invention is relatively inexpensive because it requires few parts and is easily assembled.

Although the invention has been illustrated and described in the form of a preferred embodiment, it is not intended that the invention be limited to all the specific features of that embodiment. It is apparent to those skilled in the art of lighting control that some features of the preferred embodiment can be altered without departing from the essence of the invention. It is therefore intended that the invention not be confined to the specific embodiment here disclosed but rather that the invention be delimited by the appended claims.

I claim:
1. A device for causing a lamp of the type having a filament heated to incandescence by alternating current electricity to provide three levels of illumination, the device comprising a housing forming a receptacle for receiving the base of the lamp, the housing having a hollow base adapted to be screwed into a three-way socket, first and second electrodes in the housing for making electrical connections to the filament of the lamp, a first unidirectionally conductive current controller connected to the first electrode, the first current controller being adapted to be conductive for substantially a half cycle in each cycle of the alternating current, a second unidirectionally conductive current controller connected to the first electrode, the second controller being arranged relative to the first electrode to conduct current in the direction opposite to the current conduction of the first controller, and the second current controller being adapted to be conductive for substantially less than a half cycle in each cycle of the alternating current, the first and second controllers being disposed within the hollow base of the housing, and the base having an insulative member carrying two external electrodes, each external electrode being connected to a different controller in the base whereby each controller can be separately electrically energized.

2. A device according to claim 1, wherein
the second current controller includes an SCR and means for causing the SCR to be triggered into conduction at a predetermined phase angle of the alternating current electricity.

* * * * *